United States Patent Office 3,728,253
Patented Apr. 17, 1973

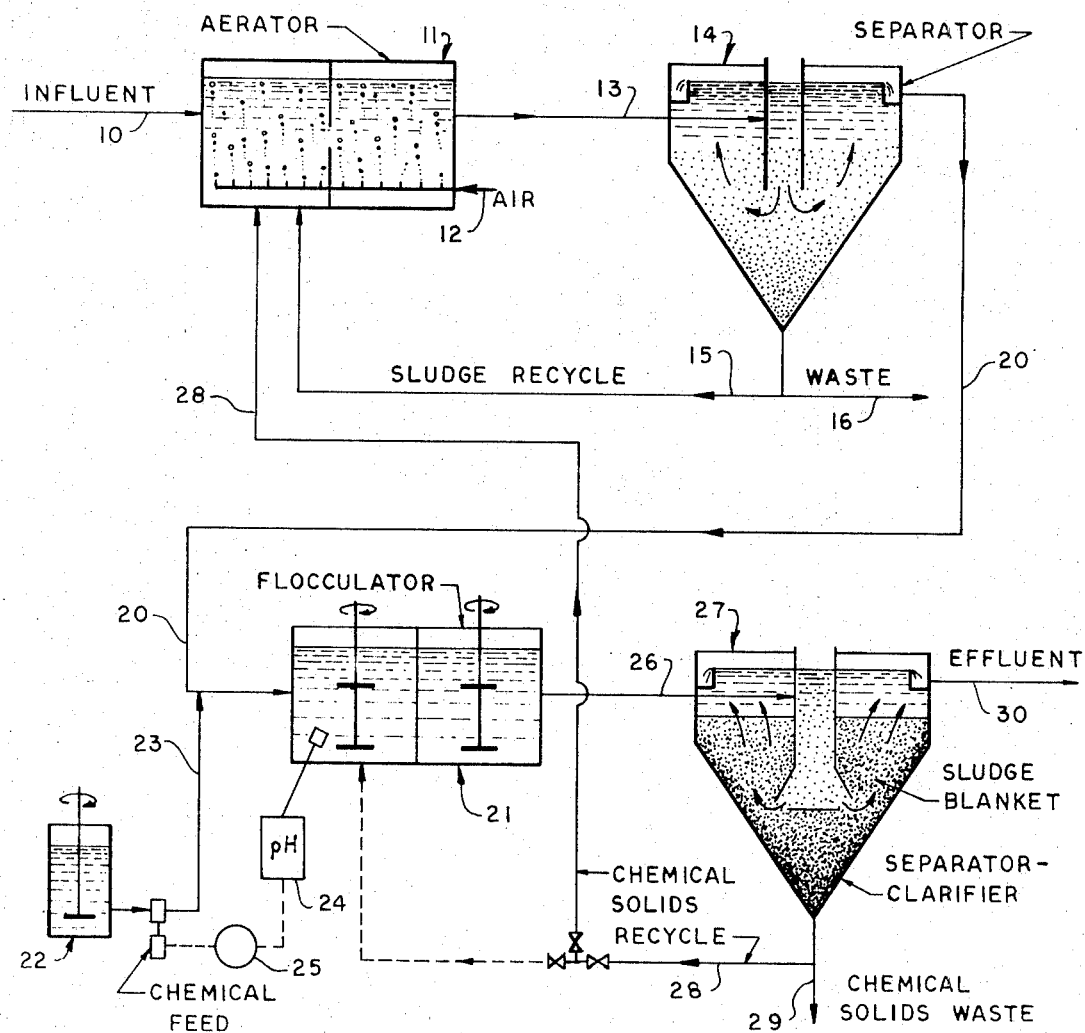

3,728,253
ACCELERATED BIOLOGICAL-CHEMICAL WASTEWATER TREATMENT
Warren J. Kaufman, El Cerrito, Calif., assignor to The Regents of the University of California, Berkeley, Calif.
Filed May 5, 1971, Ser. No. 140,381
Int. Cl. C02c 1/06
U.S. Cl. 210—5      4 Claims

ABSTRACT OF THE DISCLOSURE

In a wastewater treatment plant employing an aerobic biological process as a first stage, followed by a chemical-flocculation stage, solids obtained in the latter stage are continuously recycled to the aerobic reactor of the first stage in amounts sufficient to maintain the content of inorganic suspended material therein at a level between 30 and 60 percent based on the weight of total suspended solids present in said reactor. The presence of the chemical solids permits the biological stage to remove degradable carbon with great efficiency, even at high applied volumetric loadings such as between about 300 to 600 pounds BOD per day per 1000 cubic feet of aeration tank capacity, and at high concentrations of active biological solids ranging from 3000 to 6000 mg./l., or more. Excellent removal of phosphates is achieved in the chemical-flocculation stage. A high degree of removal of organic nitrogen is also obtained.

BACKGROUND OF THE INVENTION

The activated sludge process has been traditionally accepted as the most effective and economical means of removing degradable carbon and suspended matter from municipal and many industrial wastewaters. In this process, the basic flow scheme is one of aeration in the presence of activated sludge, followed by sedimentation and recycle of all but a small portion of the sludge from the sedimentation step. It has been recently recognized that properly conditioned recycled sludges are capable of rapid separation of dissolved and colloidal organic material from partially settled sewage, but that extended periods of aeration are required to maintain these sludges in a form readily separable by gravity. A study made in 1964 (M. J. Stewart, Activated Sludge Variations—The Complete Spectrum, reprint from Water and Sewage Works, Parts I, II, and III) reviewed this problem and concluded that systems operating with loading velocities between 0.5 and 2.0 days$^{-1}$ (pounds BOD per day per pound of mixed liquor volatile suspended solids) were prone to experience poor sludge solids separation. Expressed in terms of applied volumetric loading parameters (the mass of BOD applied per day per unit volume of aeration basin) the earlier practice has been to restrict this loading to from about 30 to 50 pounds per day per 1000 cubic feet of aeration tank capacity. In view of these limitations, designers have been led to provide long aerator detention periods, typically of from 6 to 8 hours, and to assume that total mixed liquor suspended solids cannot reliably be maintained in excess of about 2000 mg./l., with the amount of suspended volatile solids in the liquor being significantly lower.

The problem has been to find a way in which the activated sludge organisms can assimilate organic substrates at significantly higher rates than presently are possible and without the usual loss of biomass control. The phenomena which normally occur when activated sludge rapidly incorporates organic matter result in morphological changes within the population of organisms contained in the system. Specifically, the biomass changes from one of a flocculant and rapidly settleable character to a dispersed, or filamentous culture which exhibits very poor settling or clarification properties. The settling rate is extremely important because it has a direct effect on process efficiency and plant costs. Thus, if the desired high rate of organic substrate assimilation can be achieved, the aerator size can be greatly reduced over present systems. Expressed otherwise, with no change in aerator size the throughput rate of a given system could be increased in substantial measure assuming the presence of an adequate supply of oxygen. In either case, capital and operating costs are reduced.

It is an object of the present invention to provide an integrated biological-chemical wastewater treatment process having an organic loading factor which appreciably exceeds that normally employed in municipal biological water treatment systems. A further object is to provide a plant of the foregoing character wherein the level of degradable carbon removal is high and is comparable to that expected from standard-rate activated sludge plants, and wherein the unit is also capable of providing a high degree of phosphate removal and a well clarified effluent. Still another object is to provide a wastewater treatment plant which is relatively low in capital cost and is capable of removing both degradable carbon and phosphorus at a lesser cost than a combination of the conventional biological process and a following "tertiary" chemical separation of the phosphorus.

SUMMARY OF THE INVENTION

It has been discovered that the foregoing and other objects can be achieved by the provision of a novel process for the removal of degradable carbon and phosphorus from wastewaters. The process is one which employs as the first stage a biological system having an aerator and a sludge separator to remove soluble and colloidal organic materials, and as the second stage, a chemical system having a flocculator and a separator-clarifier adapted to remove phosphorus, along with suspended solids and some soluble organic compounds, by the addition of lime, alum or other floc-generating chemicals. It forms an essential feature of this invention that solids formed in the second stage are continuously recycled from the separator-clarifier to the first stage aerator in amounts sufficient to maintain the content of inorganic suspended solids therein at a level between about 30 and 60 percent by weight of total suspended solids present. This method of operation permits excellent separation and gravity settling of the biological sludge in the first stage separator even when reactor loadings are increased to levels of from 300 to 600 pounds BOD per day 1000 cubic feet of aerator capacity. Further, said separation and settling are readily effected at concentrations of active biological solids (volatile suspended solids) ranging from about 3000 mg./l. to 5000 mg./l. or higher in the mixed liquor of the aerator of the first, or biological stage.

Inasmuch as previous systems have been restricted to loadings of 30 to 50 pounds BOD per day per 1000 cubic feet of aeration capacity, it will be seen that the present process permits aerator volumes to be reduced by a factor of at least 5 to 10×. This high volumetric efficiency is achieved because of the unusual properties of the mixed sludge of high inorganic solids content. Not only does the addition of the waste chemical sludge improve the settling rate of the biomass in the first stage separator, but it also suppresses the change of the biomass to filamentous or dispersed cultures. This stabilization in biomass characteristics makes it possible to operate the aerator with very high concentrations of active biological solids, as recited above, while maintaining a continuous stable operation without overflow of the biomass sludge from the first stage separator.

The foregoing method of operation gives removals of BOD in excess of 90 percent and of COD in excess of 80 percent from domestic sewage in a chemical aided (stage 2) sludge process at volumetric loadings of from 300 to 600 pounds per day, per 1000 cubic feet of aeration basin capacity. Under these conditions of loading, the residence time in the aeration basin may be reduced to 1 hour, and good performance may be expected with as little as 20 minutes of aeration time. This control of the settleability of activated sludge solids is achieved by maintaining the content of inorganic solids in the aerator (i.e., the aeration basin) at a concentration which should be at least 30 percent and which can be as high as about 60 percent of the total suspended solids present therein. Above this range, the utility of the added inorganic solids in the aerator rapidly fall off as the said solids tend to dilute the active biomass. On the other hand, at an inorganic solids concentration of less than 30 percent the continued good separation of the sludge in the biochemical zone is prone to interruption. Similarly, for optimum performance the inorganic sludge should be continuously recycled to the aerator inasmuch as discontinuous additions of said sludge are much less successful.

Except for the high inorganic sludge loading maintained in the aerator by recycle from the chemical stage, and for the high applied reactor loadings and high solids content in the aerator, the general manner of operation and nature of the equipment employed in both stages of the present process is very much the same as is now conventionally practiced. Thus, the first stage aerator, or aeration basin, will be normally comprised of two or more aeration compartments with provision being made for the return and reaeration of solids from the separator which receives the total outflow of the aerator.

The second stage of the present process, which includes a flocculator and separator-clarifier, receives a generally clarified effluent from the first stage separator. This effluent, which contains some suspended matter, a small amount of soluble organic material, and phosphorus mostly present as phosphate ion, can be treated with any number or combination of chemicals which have the ability to precipitate phosphate and to flocculate suspended matter. Such chemicals are lime, alum, ferric chloride, polyelectrolytes and the like. The preferred chemical is lime because of its relatively low cost and the possibility of its recovery and reuse. In the case of lime, the rate of addition may be automatically controlled so as to maintain the second stage pH between 9.5 and 11.0, as appropriate. The desired pH is a function of several variables such as alkalinity and the concentration of phosphorus, magnesium and calcium, with each wastewater having different control objectives. Operation of this second stage, with the exception of sludge recycle to the first stage, is conventional and any number of flocculator or separator-clarifier designs can provide acceptable performance.

The process of the present invention may be better understood by reference to the appended drawing which shows in generally schematic fashion a two stage biochemical-chemical wastewater treatment plant which illustrates the invention in one embodiment thereof. In said drawing, various of the valves, pumps, means for loosening and moving the sludge out of the respective separators, required instrumentation etc. have been omitted. The nature and arrangement of these items will be obvious to those skilled in the art in the light of the present description.

Referring more particularly to the drawing, influent sewage from line 10 is shown as being discharged into an aerator generally indicated at 11 for aeration with incoming air or oxygen as supplied through line 12. The effluent from the aerator passes through line 13 to a separator indicated at 14 wherein the sludge settles and is in large part recycled to aerator 11 through line 15, a small faction of the sludge being discharged through line 16 as waste.

A generally clarified effluent overflowing separator 14 is carried by line 20 to a flocculator indicated at 21. Chemical additions in solution or slurry form are made from supply tank 22, the chemical being pumped through a line 23 into line 20. The rate of chemical supply is governed by a pH analyzer shown at 24 and by instrumentation indicated at 25. When lime is employed, it can be introduced to achieve a pre-set constant pH in flocculator 21. When using hydrochloric acid and alum, the feed rate of the acid can be adjusted to maintain constant pH in the flocculator while the alum is fed thereto at a constant rate.

The floc-containing effluent from flocculator 21 passes via line 26 into a separator-clarifier shown at 27 which may be a conventional unit of circular or even rectangular geometry. The unit shown is of a sludge blanket type, with chemical sludge thickening and removal being achieved by a conical bottom separator with a peripheral scraper (not shown). The removed chemical sludge is recycled through line 28 to aerator 11 at a rate so controlled as to provide the desired relative concentration of inorganic solids in the mixed liquor of the aerator. The balance of the chemical solids from unit 27 is discharged as waste through line 29. The clarified effluent from the separator-clarifier 27 is taken off through line 30 and, being extremely low in BOD, COD and phosphorus it can be discharged after pH adjustment, as appropriate.

The following example is illustrative of the invention but is not to be construed as limiting the same.

EXAMPLE

A unit of the type shown in the drawing was operated at a flow rate of 2 gallons per minute with a wastewater having a BOD (biochemical oxygen demand) of 113 and a COD (chemical oxygen demand) of 241, these values being determined by accepted standard methods. The detention time in aerator 11 was 22 minutes, and air was supplied thereto by a compressor (not shown) through bottom spargers at a rate sufficient to maintain the system aerobic. The concentration of suspended solid material (SS) in the mixed liquor of the aerator was maintained at 6000 mg./l., of which approximately 3000 mg/l. was made up of volatile suspended solids (VSS) representing organic matter, less ash. The remaining 3000 mg/l. was made up of inorganic chemical sludge supplied by way of recycle from the second stage separator-clarifier 27. The above operation resulted in an applied volumetric organic loading of 460 pounds BOD per day per 1000 cubic feet of aerator volume.

The mixed liquor from aerator 11 was passed into gravity separator 14 where the sludge solids readily separated from the mixed liquor. This sludge was in large part recycled to aerator 11, with the balance being removed from the system as a net waste stream. The liquid overflowing the separator was passed into flocculator 21 to which lime was added in an amount sufficient to maintain a pH therein of about 11, the average lime dose being 280 mg./l. The time in this flocculation zone was 16 minutes.

The effluent stream from the flocculator was passed into separator-clarifier 27 which was operated in the sludge blanket manner, residence time therein being approximately 1 hour. Of the sludge which was continuously removed at the bottom of unit 27, approximately 10 to 20 percent was recycled to aerator 11 to maintain the inorganic or mineral solid component therein at a level of 3000 mg./l. The organic solids (VSS) were also maintained at this same level.

Sludge from separator-clarifier 27 not recycled was discharged as waste. The effluent therefrom taken off through line 30 had excellent clarity and possessed the following characteristics:

BOD 9.5 mg./l., representing 92% removal
COD 41 mg./l., representing 83% removal
Total phosphorus 0.44 mg./l., representing 96% removal
Organic nitrogen 2.1 mg./l., representing 73% removal
Suspended solids (VSS) 1.9 mg./l., representing 96% removal.

While this invention has been described in conjunction with preferred embodiments thereof, it is obvious that modifications and changes therein may be made by those skilled in the art without departing from the spirit and scope of this invention which is defined by the claims appended hereto.

I claim:

1. In a process for removing degradable carbon and phosphorus from wastewaters by passing the wastewater through a two-stage system having as the first stage a biological system incorporating an aerator followed by a separator from which settled sludge is recycled to the aerator, and having as the second stage a chemical additive system incorporating a flocculator followed by a separator-clarifier, the improvement whereby solids present following addition of chemicals in the second stage and recovered from the separator-clarifier are recycled to the aerator of the first stage in amounts sufficient to maintain the content of inorganic suspended solids in the aerator at a level between 30 and 60 percent of the weight of total suspended solids there present, thereby adapting the system to be operated at high organic loadings ranging from about 300 to 600 pounds BOD per day per 1000 cubic feet of aerator capacity.

2. The process as recited in claim 1 wherein the concentration of active biological solids in the first stage aerator ranges from about 3000 to 6000 mg./l.

3. The process as recited in claim 2 wherein the aerator of the first stage is supplied with wastewater at an applied volumetric loading of from about 300 to 600 pounds BOD per day per 1000 cubic feet of aerator capacity.

4. The process as recited in claim 3 wherein the solids removed from the separator-clarifier of the second stage are continuously recycled to the aerator of the first stage to maintain the content of inorganic suspended solids therein at the desired level.

References Cited

Culp, R. L., et al.: Advanced Waste Water Treatment, 1971, Van Nostrand Reinhold Co., New York, pp. 234, 235 and 245 relied on.

MICHAEL ROGERS, Primary Examiner

U.S. Cl. X.R.

210—18